United States Patent [19]
Eriksson et al.

[11] 3,828,612
[45] Aug. 13, 1974

[54] METHOD AND MEANS FOR INDICATING TEMPERATURE VARIATIONS IN A PRODUCT, PREFERABLY A FOOD PRODUCT

[76] Inventors: Karl Gunnar Eriksson, Rankhus Kyrkbyn, Kungsangen; Sven Erik Wahlgren, Dressyrvagen 15, Jakobsberg; Carl Arnold Mangen, Rosenborgsgatan 27, Karlstad, all of Sweden

[22] Filed: Apr. 24, 1972

[21] Appl. No.: 246,578

[30] Foreign Application Priority Data
Apr. 22, 1971 Sweden .............................. 5271/71

[52] U.S. Cl. ................................. 73/356, 73/358
[51] Int. Cl. ...................... G01k 11/06, G01k 11/12
[58] Field of Search .......... 73/358, 356; 99/192 TT; 116/114.5

[56] References Cited
UNITED STATES PATENTS

| | | | |
|---|---|---|---|
| 2,460,215 | 1/1949 | Chase | 99/192 TT |
| 2,716,065 | 8/1955 | Beckett | 99/192 TT |
| 2,850,393 | 9/1958 | Romito | 73/356 |
| 2,951,764 | 9/1960 | Chase | 99/192 TT |
| 3,695,903 | 10/1972 | Telkes | 73/358 |

*Primary Examiner*—Richard C. Queisser
*Assistant Examiner*—Denis E. Corr
*Attorney, Agent, or Firm*—Murray Schaffer

[57] ABSTRACT

A method for indicating whether a product such as foodstuffs, biological preparations or the like have been subjected to conditions that would have resulted in a substantial deterioration or at least in a defective in quality of the product by means of an indicating system resulting in a permanent visible indication after a predetermined temperature level has been attained. Said indicating system comprising at least one component which is solid at the intended storage temperature and a dissolving agent for said solid component, whereby said component is partially or completely dissolved in said solvent when the system during a predetermined period of time has been subjected to a temperature exceeding the storage temperature, thereby resulting in a non-reversible visable indication.

12 Claims, No Drawings

METHOD AND MEANS FOR INDICATING TEMPERATURE VARIATIONS IN A PRODUCT, PREFERABLY A FOOD PRODUCT

The present invention relates to a method and means, for indicating visually with the help of an indicating means whether a product, for example a food product, stored at low temperature has been subjected to damaging temperature action whereupon when said damaging temperature action has occurred the means produces a permanent indication which can be visually observed.

Food products and other goods which cannot be stored at room temperature are stored nowadays in a deep-frozen state in shops or the like, or at least at low temperature so that they do not deteriorate. However, from the health point of view it is a great drawback that when a customer is buying the product is unable to determine whether the product has at some time during storage been subjected to too high a temperature (over such a long time) such that the product may have deteriorated, although at the moment of purchase it has the prescribed low temperature. It might be, for example, that a deep-frozen food product which when bought has a temperature of −10° - −20° C is in any case spoiled and unusable or is otherwise defective in quality because it has unintentionally been taken out of the freezebox earlier, for example, or has in some other way been subjected to room temperature for some time and then refrozen to the low deep-freezing temperature. Many manufacturers are satisfied with a statement as to the time frozen products will keep when stored in a refrigerator or at room temperature. It is assumed that during distribution from the manufacturer to the individual consumer the deep-frozen goods have been kept the whole time at a temperature not exceeding −15°C. Even if the distributors are extremely ambitious, however, it may happen that the temperature-sensitive goods are stored for a shorter or longer period at a temperature high enough to cause damage.

As far as food products are concerned, this may even be a health risk and there is therefore a considerable need for a simple and reliable indicating means which clearly shows whether the product has been subjected to too high a temperature over too long a period during storage and may therefore have deteriorated, even if the product has then been refrozen to the low temperature.

The present invention relates to a method and a suitable means for carrying out the method, in order to satisfy this need. The indicating means should be of such a nature that it can be applied on or near the product or its wrapping and give a visible indication, or one perceptible to the touch, which will not disappear even if the temperature is again reduced to an acceptably low level. The invention is substantially characterised by the features described in the accompanying claims.

The indication is preferably made by means of a visible alteration in the color of the indicating means, but alterations in shape or physical condition are also conceivable. The visible alteration(s) can in principle be produced by chemical, physical or chemical-physical processes, the rate and temperature-dependence of which are adapted to the requirements in question, either by a suitable choice of components or suitable treatment of one or more reaction components, or by the addition of suitable auxiliary substances. Suitably, known technical ways of influencing the rate of action of one or more of the components are used.

An example of such an indicating system is a pseudo-emulsion (possibly another unstable emulsion) of paraffin oil and a thickened outer phase. A 1 percent methyl cellulose solution may be used as thickening agent, for example. When the outer phase melts the oil drops mix together and a visual indication is obtained. The rate of this reaction depends on the viscosity of the outer phase, which is temperature-dependent. Thus, according to the invention, the desired time-temperature indication is obtained.

In the following, the invention will be further illustrated with reference to the following examples:

EXAMPLE 1

The embodiment of the invention described below is an example of a reaction in which an alteration in color occurs caused by altered pH.

Finely distributed trisodium phosphate, a solid was suspended in a time controling carrier molten solid paraffin to produce a 25 percent melt. The melt obtained was allowed to solidify to a layer about 2 mm thick. Similarly shaped samples were removed from the layer, having the weights shown in the table below. Each sample was placed in 5 ml 1/100 moles hydrochloric acid, a dissolving agent, with the addition of a small quantity of a surface active substance and was stored at the temperatures listed in the table below. 5 ml of acid corresponds to 15 mg of the phosphate upon titration with phenol phthalein as indicator.

The table shows the time taken until the pH value reached 6, which is a suitable indication point in this case.

TABLE

| quantity | time taken to reach pH 6 | |
|---|---|---|
| | 5° | 25° |
| 0.15 g | 20 days | 6 days |
| 0.18 g | 9 days | 3 days |
| 0.23 g | 7 days | 3 days |
| 0.32 g | 2–3 days | 1 day |

EXAMPLE 2

An indicating system was manufactured from 20 percent ascorbic acid, a solid component, having a particle size less than 0.15 mm in an accessibility control agent, solid paraffin having a melting point of around 55° and 0.01 M NaOH solution, a dissolving agent, with the addition of 0.5 percent Carbopol 934 (acrylic acid polymerizate) and phenol phthalein, and cresol bromide green as indicator.

EXAMPLE 3

A melt consisting of 95 percent Multiwax as an accessibility control agent, and 5 percent finely distributed salicylic acid as a solid component (max. particle size 150 microns) was prepared and brought to a temperature of 60° C. Strips of filter paper about 1 cm wide were dipped into this melt, taken up immediately and allowed to cool on a sheet of glass. Strips of filter paper treated in this way were cut into lengths of 3 cm and immersed in glass mugs containing 5 ml of a 0.1 percent $FeCl_3$ solution, a dissolving agent. One such mug was stored in a refrigerator at a temperature of 6° C and one mug at room temperature (20° C).

RESULT

At 6° C

After 3 hours storage there was slight colour
After 6 hours storage the colour was obvious
After 16 hours storage the colour was intense At 20° C After 3 hours storage the colour was obvious
After 6 hours storage the colour was intense An alteration of the experimental conditions to include salicylic acid to a) 2.5 percent and b) 10 percent of the wax mixture gave the following result.

At 20° C a. After 24 hours storage there was slight colour
b. After 15 minutes storage the colour was intense.

The invention is of course in no way limited to the examples given above but can be exploited by one skilled in the art in many different ways within the scope of the following claims.

What we claim is:

1. A method for determining whether a stored food product has been damaged by being subjected to a temperature rise above a predetermined lower temperature level comprising providing a system having at least one component which is solid at the temperature of said lower level and dissolvable at a temperature above said lower level, and a dissolving agent for said component which is maintained inactive at said lower temperature, said dissolving agent being irreversibly rendered active in proportion to the length of time said system is subjected to a temperature rise above said lower temperature, controlling the amount of said one component accessible over a period of time to said dissolving agent at a temperature above the lower limit to regulate the rate of dissolution of said solid component providing an indicator permanently activated in proportion to the amount of dissolved one solid component, disposing said system in the presence of said food product at said lower temperature and maintaining said food product and said system under stored conditions until such time as a permanent visual indication is obtained of a predetermined amount of dissolution of said one component within said dissolving agent.

2. The method according to claim 1, wherein said system is applied to the product or in a storage space therefor.

3. The method according to claim 1, wherein the accessibility of the solid component is controlled by means of a surface treatment.

4. The method according to claim 1, wherein the solid component is embedded in a carrier which controls the accessibility of the solid component to the action of the solvent.

5. The method according to claim 1, wherein the indication sequence of said system is controlled by regulating the viscosity or surface tension of the solvent.

6. A composition for visual determining the extent of a temperature rise above a predetermined maximum temperature comprising at least one component which is solid below said maximum temperature, a dissolving agent for said component which is maintained inactive at said maximum temperature, said dissolving agent being irreversibly rendered active in proportion to the length of time said system is subjected to a temperature above said maximum temperature, means for controlling the amount of said solid component accessible over a period of time to said dissolving agent above said maximum temperature to regulate the rate of dissolution of said solid component and an indicator activated in proportion to the amount of dissolved solid component, whereby the actual dissolution of said component within said dissolving agent results in an indication of the length of time said composition is maintained at a temperature above said maximum.

7. The composition according to claim 6 including a color indicator disposed in the presence of said at least one component and said dissolving agent and operative to be entrapped in the resultant liquid mass formed between by the dissolution thereof when said temperature increases above said pre-set maximum.

8. The composition as defined in claim 6 wherein the indicator is disposed in said at least one component.

9. The composition as defined in claim 6 wherein said indicator is admixed with said dissolving agent.

10. An indicating agent as defined in claim 6 wherein said means for controlling the accessibility of said one component comprises a carrier and said at least one component is embedded in said carrier.

11. The composition as defined in claim 10 wherein said carrier is operative to delay the dissolution of said at least one component.

12. The composition as defined in claim 6 wherein said at least one component is pre-treated with a surface active agent to provide said means for controlling the accessibility to said one component.

* * * * *